United States Patent [19]
Romanauskas

[11] Patent Number: 5,362,293
[45] Date of Patent: Nov. 8, 1994

[54] DRIVE CLUTCH FOR A CENTRIFUGE ROTOR

[75] Inventor: William A. Romanauskas, Southbury, Conn.

[73] Assignee: E. I. Du Pont de Nemours and Company, Wilmington, Del.

[21] Appl. No.: 165,245

[22] Filed: Dec. 13, 1993

Related U.S. Application Data

[62] Division of Ser. No. 990,104, Dec. 14, 1992, abandoned.

[51] Int. Cl.⁵ .......................... B04B 9/00; F16D 41/06
[52] U.S. Cl. ..................................... 494/84; 192/43.2; 192/45.1; 192/79; 192/104 C; 192/107 T
[58] Field of Search ........................................ 494/7–9, 494/16, 84; 192/41 A, 43.1, 43.2, 45.1, 48.92, 79, 8 R, 103 B, 104 C, 107 T; 210/360.1, 368, 380.1

[56] References Cited

U.S. PATENT DOCUMENTS

| | | | |
|---|---|---|---|
| 2,385,799 | 10/1945 | Dodge | 192/45.1 |
| 2,443,593 | 6/1948 | Birsch | 494/84 X |
| 2,476,377 | 7/1949 | Le Clair | 494/60 X |
| 2,551,980 | 5/1951 | Tholl | 192/45.1 X |
| 3,094,195 | 6/1963 | Lund | 192/45.1 X |
| 3,216,544 | 11/1965 | Ryan | 192/41 A |
| 3,314,510 | 4/1967 | Zlotek | 192/43.1 X |
| 3,447,650 | 6/1969 | Dossier | 192/104 C X |
| 3,599,767 | 8/1971 | Sederquist | 192/45.1 X |
| 3,907,083 | 9/1975 | Nieder | 192/45.1 X |
| 4,101,070 | 7/1978 | Hoare et al. | |
| 4,693,351 | 9/1987 | Adolfsson | 192/43.1 X |
| 4,753,630 | 6/1988 | Romanauskas | 494/84 X |
| 4,897,075 | 1/1990 | Sharples | |
| 4,927,406 | 5/1990 | Glen et al. | |

FOREIGN PATENT DOCUMENTS

| | | | |
|---|---|---|---|
| 281666 | 9/1988 | European Pat. Off. | |
| 2328983 | 1/1975 | Germany | |
| 3601720 | 7/1987 | Germany | 192/45.1 |
| 2195029 | 8/1990 | Japan | 192/41 A |
| 384222 | 4/1991 | Japan | 192/43.1 |

OTHER PUBLICATIONS

Article on "Devices For Controlling Motion Direction and Overload", Machine Design of Jun. 1991, p. 132.
Article on "Formsprag® Over-Running clutches . . . instantaneous action, no backlash, high torque, compact, reliable", Warner Electric, Basics of Design Engineering, p. 141, date unknown.
Advertisement on Rologlide Polymer Clutches sold by Seitz Corporation of Torrington, Conn. 06790, date unknown.

*Primary Examiner*—David A. Scherbel
*Assistant Examiner*—Charles Cooley

[57] ABSTRACT

A clutch assembly for a centrifuge rotor includes at least one pair of complementary clutch elements each operatively associated with the rotor. Each element in the pair is preloaded into contact with the drive shaft. A torque applied to the shaft in either a first or second direction about an axis of rotation is transmitted from the drive shaft to the rotor through one of the clutch elements.

1 Claim, 3 Drawing Sheets

DRIVE CLUTCH FOR A CENTRIFUGE ROTOR

This is a division of application Ser. No. 07/990,104 filed Dec. 14, 1992, now abandoned.

BACKGROUND OF THE INVENTION

1. Field of the Invention

The present invention relates to a centrifuge rotor, and in particular, to a centrifuge rotor having a drive clutch assembly thereon.

2. Description Of the Prior Art

A centrifuge rotor is an apparatus in which a liquid sample may be subjected to a centrifugal force field. The rotor has a central axial mounting recess provided therein. The recess receives a coupling member, commonly termed a "spud", provided at the top of a drive shaft, thereby to connect the rotor to a source of motive energy.

Coupling a centrifuge rotor to its drive shaft presents unique problems, since it may be required to remove or replace a rotor as frequently as once per run. The drive coupling functions both to center accurately the rotor on the drive shaft and to transmit drive torque to the rotor. The centering function may be accomplished by providing a tapered shaft seat on the top of the drive shaft and by correspondingly tapering the recess in the rotor. For a small angle taper, termed a "locking taper", this arrangement also serves to transmit drive torque to the rotor. Unfortunately, such a locking taper makes removal of the rotor difficult. In situations where frequent rotor removal is required a tapered drive coupling must exhibit a relatively steep angle. Torque transmittal is then dependent upon the downward force exerted on the taper derived from either the weight of the rotor or from another hold-down mechanism.

Since, in the usual case, the rotor is fabricated from materials such as aluminum or titanium, the mass of the rotor is usually sufficient to couple frictionally the rotor to the drive shaft so that torque from the source may be transmitted to the rotor.

Technology is evolving toward the use of non-traditional materials, such as composites, to fabricate centrifuge rotors. A rotor fabricated from such non-traditional materials is lighter in weight and, accordingly, may not have a mass sufficient to couple frictionally such a rotor to the coupling member to effect torque transmission. A rotor fabricated from composite materials is disclosed in copending application Ser. No. 07/664,174, filed Mar. 1, 1991, assigned to the assignee of the present invention. The International counterparts of this application have been published on Feb. 21, 1991 as publication WO 91/02302 and on Sep. 17, 1992 as publication WO 92/15930.

In view of the foregoing it is believed advantageous to provide a rotor with a coupling assembly that permits easy removal or insertion of a rotor without having the transmission of torque limited by the weight of the rotor.

SUMMARY OF THE INVENTION

The present invention relates to a centrifuge rotor having a clutch assembly comprising at least one pair of complementary clutch elements. Each clutch element is operatively associated with the rotor and is preloaded into contact against the drive shaft. Drive torque imposed on the drive shaft in either a first or second direction about an axis of rotation wedges one of the clutch elements between the rotor and the shaft whereby torque is transmitted to the rotor through the one of the clutch elements. The clutch elements may be formed integrally with or separately from the rotor.

In accordance with a first embodiment of the invention each of the clutch elements comprises a separate, generally triangular wedge-shaped member that is pivotally mounted within a respective pocket formed in the rotor. The center of mass of each clutch element lies on or forwardly of, in the respective direction of torque application, a line connecting the pivot point of each respective clutch element and the axis of rotation. Application of torque in a respective first or second direction causes one of the clutch elements to pivot to bring the cam surface thereon into wedged engagement with the drive shaft and with the rotor whereby torque is transmitted to the rotor.

In accordance with a second embodiment each clutch element comprises an elongated flexible member formed integrally with the rotor. The clutch elements are arranged in a generally V-shaped configuration. Application of torque in a respective first or second direction brings a respective one of the clutch elements into wedged engagement with the drive shaft and with the rotor whereby torque is transmitted to the rotor. Each clutch element has a center of mass, with the centers of mass arranged such that when the rotor is rotated in a first direction one of the elements is urged into torque transmitting contact between the rotor and the drive shaft, while the other of the elements is urged away from contact with the drive shaft.

In the preferred case the clutch arrangement, in whatever embodiment utilized, is located within a housing that is attached to the rotor.

BRIEF DESCRIPTION OF A DRAWINGS

The present invention will be fully understood from following detailed description thereof, taken in connection with the accompanying drawings, which form a part of this application, and in which.

DETAILED DESCRIPTION OF THE INVENTION

Figure 1:
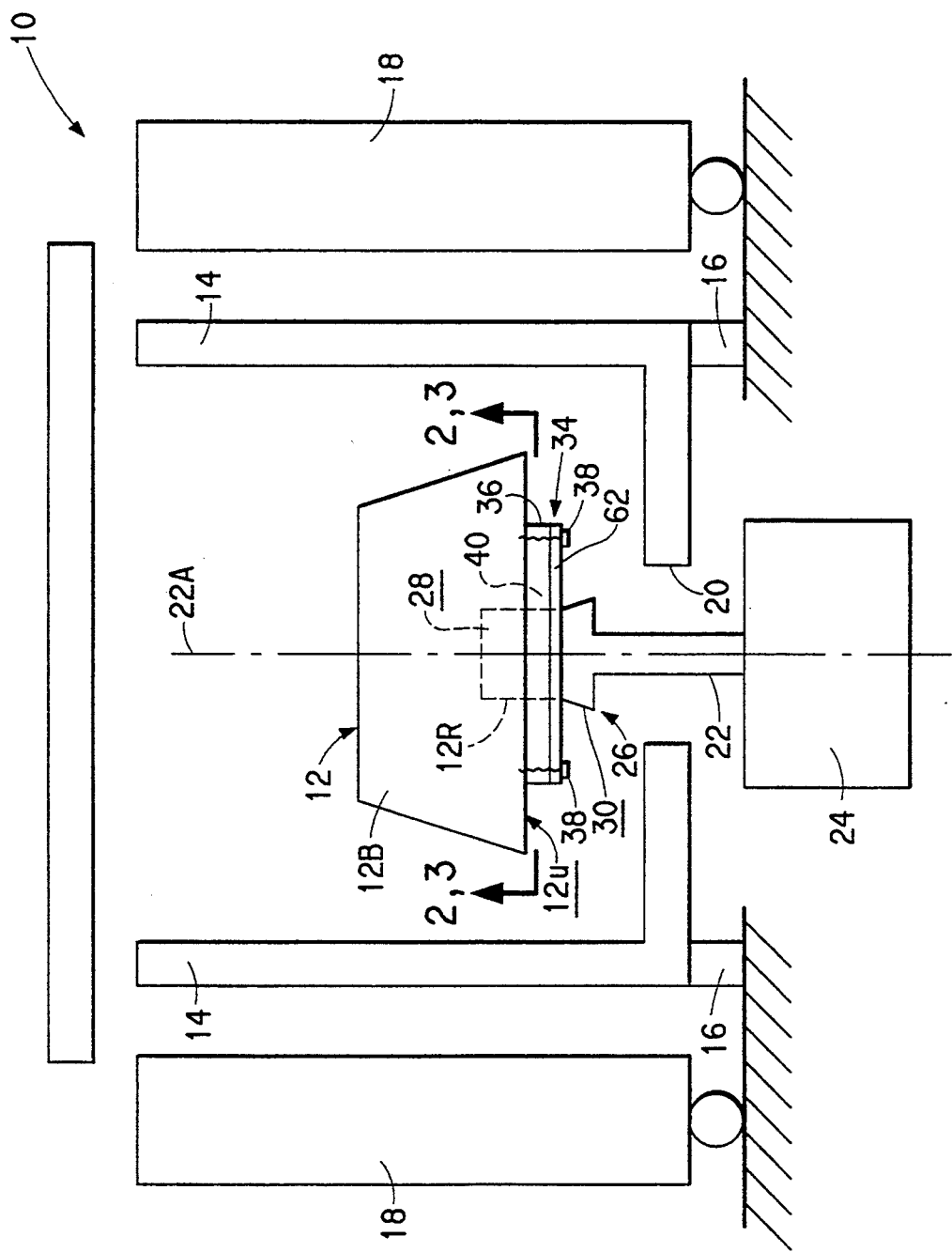
FIG. 1 is a stylized pictorial representation of a centrifuge instrument with which a rotor having a clutch assembly in accordance with the present invention may be used.

Throughout the following detailed description, similar reference numerals refer to similar elements in all Figures of the drawings.

With reference to FIG. 1 shown is a stylized pictorial representation of a typical centrifuge instrument 10 in which a rotor 12 in accordance with the present invention may be used. The instrument 10 includes a chamber, or bowl, 14 supported on a framework 16. The bowl 14 is surrounded by a concentrically disposed guard ring 18. The bowl 14 has a central opening 20 disposed therein. A drive shaft 22 from a suitable motive source 24 extends through the opening 20 into the interior of the bowl 14. The drive shaft 22 has a central axis 22A extending therethrough. The axis 22A defines the axis of rotation for the rotor 12 mounted on the drive shaft 22. The upper end of the drive shaft 22 has a mounting member, or "drive spud", 26 thereon. The spud 26 includes a cylindrical portion 28 with a frustoconical torque transmission surface 30 adjacent thereto.

The rotor 12, which is preferably fabricated from a composite material, includes a main body portion 12B having an undersurface 12U thereon. A mounting recess 12R extends into the body 12B from the undersurface 12U. The recess 12R is configured to accept the cylindrical portion 28 of the drive spud 26. Since the mass of the composite rotor 12 may be insufficient to couple the rotor 12 into a torque transmissive relationship with the frustoconical surface 30, the rotor 12 is provided with a clutch assembly generally indicated by the reference character 34, best seen in FIGS. 2 and 3.

The clutch assembly 34 is, in the preferred instance, disposed in a housing 36 that is secured, as by bolts 38, to the undersurface 12U of the rotor 12. The housing 36 for the clutch assembly 34 may, alternatively, be formed integrally with the rotor 12 and remain within the contemplation of the present invention. The housing 36 has a recess 40 that registers axially with the recess 12R in the rotor body 12B. The recess 40 in the clutch housing 36 also receives the cylindrical portion 28 of the spud 26.

Figure 2:
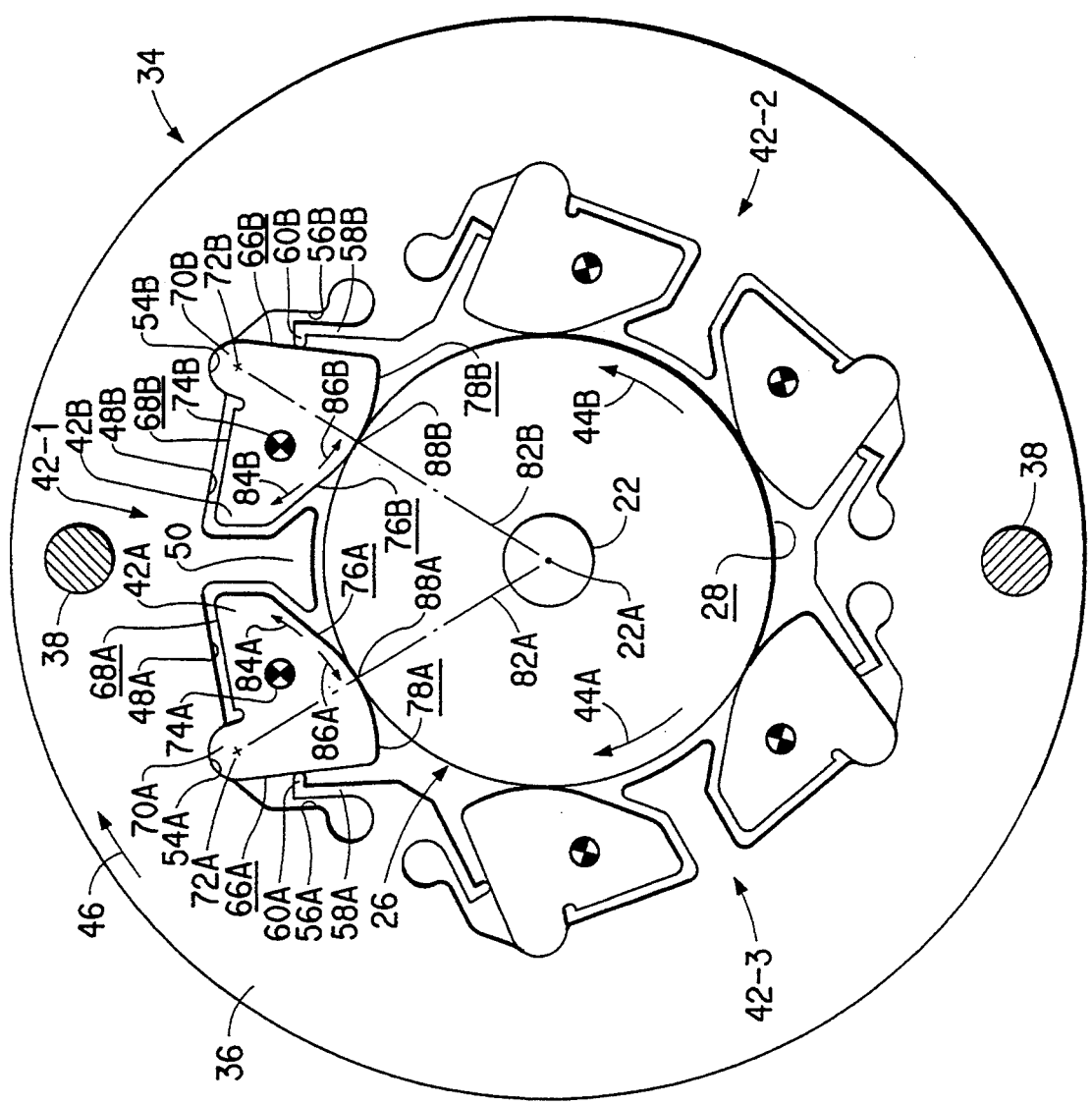
FIG. 2 is a bottom view of a centrifuge rotor having a clutch assembly in accordance with a first embodiment of the present invention taken along section lines 2—2 of FIG. 1.

A first embodiment of the clutch assembly 34 is illustrated in FIG. 2. In general, the clutch assembly 34 comprises at least one pair of complementary clutch elements 42A, 42B. However, since in the most preferred instance three pairs of clutch elements (indicated by the reference characters 42-1, 42-2, 42-3) are equiangularly disposed about the axis of rotation 22A, that arrangement is illustrated in FIG. 2. By "complementary" it is meant that the clutch elements 42A, 42B in each pair are disposed in mirror-image fashion with respect to each other, as seen in FIG. 2. Each clutch element 42A, 42B in each pair is operatively associated with the rotor 12 (via the housing 36) and is preloaded into contact with the drive shaft 22, as through the cylindrical portion 28 of the drive spud 26. Torque applied to the drive shaft 22 in either a respective first or second direction 44A, 44B with respect to the axis of rotation 22A is transmitted to the rotor 12 through a respective one of the clutch elements 42A, 42B in each pair. For purposes of discussion, torque applied in the direction 44A will serve to accelerate the rotor 12 and cause the same to rotate in the direction 46, while torque applied in the direction 44B will serve to brake the rotor 12.

In the embodiment of the invention shown in FIG. 2 each clutch element 42A, 42B in each pair is received within a respective first and second pocket 48A, 48B formed within the clutch housing 36. The pockets 48A, 48B in each pair are separated by a septum 50. In the embodiment illustrated in FIG. 2 each clutch element 42A, 42B is a separate member preferably formed by molding from a suitable plastic material, such as a glass fiber reinforced polyimide.

Within each pocket 48A, 48B the housing 36 is contoured to define respective sockets 54A, 54B. In addition, the material of the clutch housing 36 is undercut, as at 56A, 56B, within each respective pocket 48A, 48B to define cantilevered spring arms 58A, 58B. Each arm 58A, 58B has a finger 60A, 60B respectively thereon. The clutch elements 42A, 42B are biased, or preloaded, into contact with the surface 28 by the action of the spring arms 56A, 56B. The bottom of the housing 36 is closed, as by a plate 62 (FIG. 1) to prevent the clutch elements 42A, 42B from falling from the pockets 48A, 48B when the rotor 12 is in use.

In accordance with the first embodiment of the invention each clutch element 42A, 42B is a generally triangular, wedge-shaped member having a respective first planar abutment surface 66A, 66B and a respective second planar abutment surface 68A, 68B thereon. Intermediate the surfaces 66A, 68A and 66B, 68B is a rounded protrusion 70A, 70B. Each protrusion 70A, 70B is contoured to conform to the contour of the respective sockets 54A, 54B. The geometric center of the contour of each protrusion 70A, 70B is respectively indicated at 72A, 72B, while the center of mass of each clutch element is indicated by the characters 74A, 74B. The ends of the surfaces 66A, 68A and 66B, 68B on each respective clutch element 42A, 42B are joined by a cam surface generally indicated by the characters 76A, 76B.

A radial reference line 82A, 82B may be defined between the axis of rotation 22A and the geometric center 72A, 72B of the protrusion 70A, 70B on each of the clutch elements 42A, 42B. In accordance with the present invention the center of mass 74A, 74B of each of the clutch elements 42A, 42B is positioned on, or more preferably, forwardly of the respective radial reference lines 82A, 82B in the respective direction of torque application 44A, 44B. Each of the clutch elements 42A, 42B is thus pivotally movable within its respective socket 54A, 54B about its respective geometric center 72A, 72B. The pivotal motion of each clutch element 42A, 42B is indicated by the respective reference arrows 84A, 84B and 86A, 86B.

A portion 78A, 78B of each respective cam surface 76A, 76B has a rise (increasing distance) extending in the respective directions 86A, 86B from the vicinity of the point of camming contact 88A, 88B with the drive spud 26, while having a fall (decreasing distance) extending in the respective direction 84A, 84B from the vicinity of the point of camming contact 88A, 88B with the drive spud 26. This requirement for the portion 78A, 78B of the cam surface may be satisfied using a cam contour having a radius centered on a respective center point that is spaced from the pivot center 72A, 72B.

The operation of the clutch assembly 34 in accordance with this embodiment of the present invention may now be discussed. At rest, the clutch elements 42A, 42B are in frictional engagement with the drive spud 26. A torque in the direction 44A applied to the drive spud 26 via the shaft 22 will cause the clutch element 42A to pivot about the socket center 72A and to wedge itself between the socket 54A in the housing 36 and the drive spud 26. This wedging action increases the frictional engagement between the clutch element 42A and the drive spud 26 thereby driving the rotor 12 via the clutch housing 36 in the direction 46.

To function effectively the clutch element 42A must be in frictional contact with the drive spud 26 at all times, both when rotating and when not rotating. When at rest, the spring arm 58A preloads the clutch element 42A against the spud 26. However, centrifugal body forces acting on the spring arm 58A will reduce the preload effect on the clutch element 42A. Eventually a rotating speed is reached at which the preload will be entirely cancelled. To insure frictional contact between the clutch element 42A and the drive spud 26 throughout the entire rotational speed range the center of gravity 74A of the clutch element 42A must lie forwardly (with respect to the torque direction 44A) of the line 82A connecting the center of rotation 22A and the center 72A of the protrusion 70A.

Application of a torque in the opposite direction 44B, as when braking, causes the clutch element 42A to automatically disengage. However, the clutch element 42B will immediately engage, allowing the braking torque 44B to be transferred to the rotor 12 via the housing 36. This braking mode is highly desireable and is achieved as a consequence of the complementary relationship between the clutch elements 42A, 42B in their respective pockets 48A, 48B. The clutch assembly 34 shown in FIG. 2 is thus bi-directional and independent of rotor speed.

Figure 3:
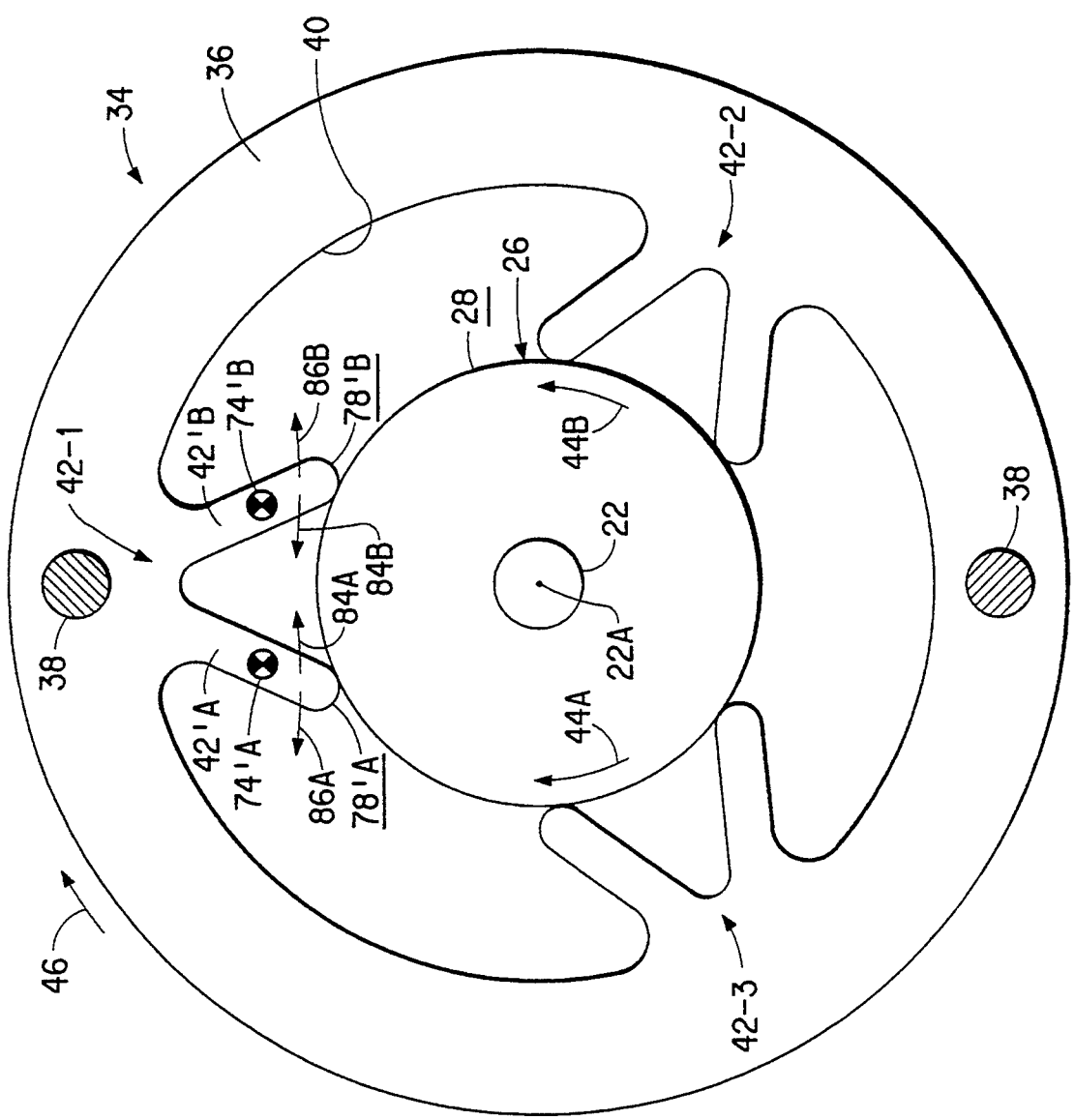
FIG. 3 is a bottom view similar to FIG. 2 of a centrifuge rotor having a clutch-assembly in accordance with a second embodiment of the present invention taken along section lines 3—3 of FIG. 1.

FIG. 3 illustrates an alternate embodiment of the clutch assembly 34 of the present invention, believed more useful in a lower speed application than the embodiment of FIG. 2. In this embodiment the pockets 48A, 48B become merged with and are indistinguishable from the recess 40 in the housing 36. Again, three pairs 42-1, 42-2, 42-3 of clutch elements 42'A, 42'B are equiangularly disposed about the axis of rotation 22A. Each of the complementary clutch elements 42'A, 42'B in each pair are formed integrally with the clutch housing 36 and are arranged in a generally V-shaped configuration. Each clutch element 42'A, 42'B is an elongated, generally radially extending spring member. The center of mass of each element is indicated by the symbol 74'A, 74'B. The free end of each clutch element 42'A, 42'B defines the cam surface 78'A, 78'B respectively. When the rotor 12 is mounted to the drive shaft 22 the resiliency of the clutch elements 42'A, 42'B preloads the same against the drive spud 26.

As in the situation earlier described in connection with the first embodiment, depending upon the direction of torque application an accelerating or a decelerating force is transmitted from the shaft to the rotor 12 through one or the other of the clutch members 42'A, 42'B. For a torque applied in the direction 44A frictional contact between the drive spud 26 and the cam surface 78'A of the element 42'A pivots the element 42'A in the direction 84A. This creates a wedging action that increases the frictional driving engagement between the rotor 12 and the drive spud 26. The rotor thus rotates in the direction 46.

As rotor speed increases the body forces acting on the clutch element 42'A, 42'B overcome the initial preloading of these elements. Thus both of the clutch elements 42'A, 42'B can be designed such that, when a predetermined speed is reached, the body forces acting on both of the elements 42'A, 42'B may be such that both clutch elements are disengaged from the rotor.

It is apparent, based on the obvious complementarity, that the embodiment of the invention shown in FIG. 3 the clutch assembly 34 is bi-directional. However, the operation of the clutch assembly of FIG. 3 is not speed independent.

The second embodiment of the invention may be implemented using a generally U-shaped spring member that is separate from the rotor 12. The spring member may be received within a pocket (similar to the pocket 48A, 48B) formed in the clutch housing or the rotor body, as the case may be. Analogous to the situation of FIG. 3, each leg of the U-shaped member defines a clutch element. The free ends of the legs of the U-shaped member respectively abut against the shaft 22 or against the surface 28 of the spud 26. The closed end of the U-shaped member abuts against the clutch housing 36 or the rotor, as the case may be. The operation of such an arrangement is directly analogous to the operation of the embodiment of FIG. 3, as discussed.

Further alternate forms of a separate clutch member may be devised. For example, a clutch member having a main body portion that is generally pyramidal in overall shape (when viewed in the plane of FIG. 3) with generally rounded corners may be disposed in the pocket in the housing. The legs which define the clutch elements in such a member may be formed by providing a hollow, or interruption, in the base of the pyramid (i.e., the side of the member next adjacent to the spud 26.

It should be apparent from the foregoing that, however configured, each of the embodiments of the clutch assembly shown or discussed herein includes a complementarily disposed pair of clutch elements that are preloaded into contact with the drive spud to insure at least minimal frictional engagement at zero speed, and which become increasingly wedged into contact to transmit torque to the rotor. The body forces imposed on the clutch elements may be used to either add or to detract from the effect of the preload. In the embodiments of FIG. 2, the clutch elements are configured so that their body forces add to the preload. In the embodiment of FIG. 3, the body forces of the clutch elements detract from the preload.

Those skilled in the art, having the benefit of the teachings of the present invention may impart numerous modifications thereto. Such modifications are to be construed as lying within the scope of the present invention, as defined by the appended claims.

What is claimed is:

1. A centrifuge rotor mountable to a drive shaft, the rotor having a lower surface thereon, the rotor comprising:

a housing secured to lower surface of the rotor;
a clutch assembly disposed within the housing, the clutch assembly comprising at least one pair of complementary clutch elements each operatively associated with the rotor,
each clutch element being a generally elongated flexible spring member formed integrally with the housing, the clutch elements being arranged in a generally V-shaped configuration, when mounted on the shaft the resiliency of each clutch element in the pair preloaded it into contact with the drive shaft,
application of torque in a respective first or second direction bringing a respective one of the clutch elements into wedged engagement with the drive shaft and with the rotor whereby torque is transmitted to the rotor,
each of the clutch elements flexing in response to body forces imposed thereon to disengage from the shaft when the rotor reaches a predetermined operating speed.

* * * * *